US010288166B2

(12) United States Patent
Chrungoo et al.

(10) Patent No.: US 10,288,166 B2
(45) Date of Patent: May 14, 2019

(54) SYSTEM AND METHOD FOR PREDICTING AND RESPONDING TO SOFT UNDERFOOT CONDITIONS

(71) Applicant: CATERPILLAR INC., Peoria, IL (US)

(72) Inventors: Addwiteey Chrungoo, San Francisco, CA (US); Sandesh Gowda, West View, PA (US); Ananth Purushotham Kini, Dunlap, IL (US); Philip Carl Wallstedt, Washington, IL (US); Kevin Anthony Davis, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 128 days.

(21) Appl. No.: 15/657,627

(22) Filed: Jul. 24, 2017

(65) Prior Publication Data

US 2019/0024781 A1    Jan. 24, 2019

(51) Int. Cl.
*F16H 59/66* (2006.01)
*G01C 21/26* (2006.01)
(Continued)

(52) U.S. Cl.
CPC .......... *F16H 59/66* (2013.01); *B60R 21/013* (2013.01); *G01C 21/26* (2013.01); *G08G 1/162* (2013.01); *B60W 2050/0089* (2013.01)

(58) Field of Classification Search
CPC ....... F16H 59/66; B60R 21/013; G01C 21/26; G08G 1/162; B60W 2050/0089
See application file for complete search history.

(56) References Cited

U.S. PATENT DOCUMENTS

2010/0161190 A1* 6/2010 McCann ................ B60K 17/20
701/69
2011/0054750 A1* 3/2011 Polenz ................ B60K 28/165
701/58

(Continued)

*Primary Examiner* — Calvin Cheung
(74) *Attorney, Agent, or Firm* — Finnegan, Henderson, Farabow, Garrett & Dunner, LLP

(57) ABSTRACT

A soft underfoot conditions response system for use with a vehicle includes a plurality of sensors configured to transmit signals indicative of live data representing at least one of real time vehicle speed, vehicle acceleration, vehicle pose, vehicle payload, engine torque, engine power output, and engine RPM, and a controller communicatively coupled with the sensors. The controller is programmed to receive the live data, receive reference data representative of soft underfoot conditions from a database, and analyze the live data and the reference data. The controller determines a first set of parameters including measured real time values corresponding to wheel slip ratio and rolling resistance, vehicle speed, and vehicle pose, extracts from the reference data at least one of a first data subset containing vehicle operational parameters identified by an operator as being associated with soft underfoot conditions, and a second data subset containing data extracted using heuristics, and builds and trains a model for use by a classifier that segregates data subsets from the first set of parameters into a first classification that includes parameters that characterize surfaces with soft underfoot conditions, and a second classification that includes parameters that characterize surfaces without soft underfoot conditions. The controller also generates control command signals that cause a change in vehicle operational parameters to reduce or avoid any effects on operation of the vehicle associated with soft underfoot conditions.

20 Claims, 6 Drawing Sheets

(51) Int. Cl.
*G08G 1/16* (2006.01)
*B60R 21/013* (2006.01)
*B60W 50/00* (2006.01)

(56) References Cited

U.S. PATENT DOCUMENTS

2014/0048296 A1* 2/2014 Bassett .................. A01B 71/02
172/4
2015/0166072 A1* 6/2015 Powers ................ B60W 40/06
701/1

* cited by examiner

SYSTEM AND METHOD FOR PREDICTING AND RESPONDING TO SOFT UNDERFOOT CONDITIONS

TECHNICAL FIELD

The present disclosure relates generally to soft underfoot conditions experienced by a machine and, more particularly, to a system and method for predicting and responding to the soft underfoot conditions.

BACKGROUND

Machines such as, for example, on and off-highway haul trucks, and other types of heavy equipment are used to perform a variety of tasks. Some of these tasks involve traveling between two or more locations. This traveling can include traversing one of many possible paths at a job site. The paths traversed by the machines may include unpredictable surface conditions caused by weather conditions, usage patterns, machine load losses, natural disasters, tectonic shifts, mud slides, rock slides, and/or other deteriorative events and/or processes. Roadways that are rendered unpredictable may have unpredictable portions, which may include, for example, ice, mud, sand, loose gravel, standing water, or other combinations of surface characteristics leading to soft underfoot conditions. Off-highway machines operating at job sites, such as oil sands mining sites in particular, are often subject to soft underfoot conditions, including surfaces that are loose and viscous, forcing trucks and other machines to modify driving behavior on the fly. The ability to make timely modifications to operating characteristics and driving behavior for the off-highway machines operating under these conditions is largely dependent on predicting and identifying the presence of soft underfoot conditions. Unpredictable portions of a job site may increase time and/or costs associated with traveling between two or more locations. For example, a machine may traverse a portion of a job site, find that the surfaces in that portion include standing water or other conditions resulting in especially viscous or soft conditions, and be re-routed along another one of the possible paths. Moreover, as multiple machines traverse the same paths at a job site, soft underfoot conditions may worsen as ruts formed by each machine are repeatedly traversed by other machines. Re-routing machines at a job site may increase time and/or costs associated with traveling between two or more locations. The unpredictable portions with soft underfoot conditions may also disable the machine. For example, the machine may slip, get stuck, deplete its energy (e.g., fuel or electric charge), crash, or otherwise be disabled by the unpredictable portions.

One way to minimize the effect of unpredictable portions of roadways is to facilitate communications between machines and/or remote offices regarding the unpredictable portions. An example of facilitating communications between machines and/or remote offices is described in U.S. Patent Application Publication No. 2004/0122580 (the '580 publication) by Sorrells, published on Jun. 24, 2004. The '580 publication describes a control module, which determines if a machine is operating on a road having an adverse road condition. Adverse road conditions include soft underfoot conditions, steep grades, and potholes. Additionally, the '580 publication describes updating a site map stored in the control module or a remote office to show the adverse road condition. The '580 publication also describes using the control module or the remote office to notify an operator of the machine that the machine is approaching the adverse road condition. Additionally, the '580 publication describes using the control module or the remote office to dispatch a machine to the location of the adverse road condition for the purpose of correcting the adverse road condition.

However, the '580 publication does not provide a solution for actually predicting the presence of soft underfoot conditions for large off-highway trucks not dependent on receiving communications from other vehicles or remote offices. Moreover, the '580 publication does not provide a system and method for allowing machines to predict and respond to conditions that are likely to result in excessive wheel slip or rolling resistance, or other problems associated with soft underfoot conditions.

The present disclosure is directed to overcoming one or more of the problems set forth above and/or other problems in the art.

SUMMARY

In one aspect, the present disclosure is directed to a soft underfoot conditions response system for use with a vehicle. The soft underfoot conditions response system may include a sensing system configured to generate signals indicative of live data representing at least one of real time wheel slip ratio and real time rolling resistance for the vehicle operating at a job site, a plurality of sensors configured to transmit signals indicative of live data representing at least one of an image of a job site surface having features and characteristics associated with a presence or a lack of soft underfoot conditions, real time vehicle speed, vehicle acceleration, vehicle pose, vehicle payload, engine torque, engine power output, and engine RPM, and a controller comprising one or more processors, and one or more memory devices, the controller being communicatively coupled with the sensing system and the sensors. The controller is configured and programmed to receive the live data from the sensing system and the sensors, receive reference data representative of soft underfoot conditions from a database, and analyze the live data received from the sensing system and the sensors, and the reference data received from the database. The controller is also configured to determine a first set of parameters including measured real time values corresponding to at least one of an image of job site surface conditions, wheel slip ratio, rolling resistance, vehicle speed, and vehicle pose. The controller is further configured to extract from the reference data at least one of a first data subset containing at least one of an image of job site surface conditions and vehicle operational parameters identified by an operator as being associated with soft underfoot conditions, and a second data subset containing data extracted using heuristics including identification of values for a mean rolling resistance greater than a threshold level of rolling resistance for greater than a first threshold time period, values for a vehicle speed greater than a threshold level of vehicle speed, and values for a wheel slip ratio greater than a threshold level of wheel slip ratio for greater than a second threshold time period. The controller is still further configured to build and train a model for use by a classifier that segregates data subsets from the first set of parameters into a first classification that includes parameters that characterize surfaces with soft underfoot conditions, and a second classification that includes parameters that characterize surfaces without soft underfoot conditions, and generate control command signals that cause a change in vehicle operational parameters to reduce or avoid any effects on operation of the vehicle associated with soft underfoot conditions.

In another aspect, the present disclosure is directed to a method for predicting and responding to soft underfoot conditions. The method may include transmitting signals from sensors associated with the vehicle and indicative of live data representing at least one of an image of a job site surface having features and characteristics associated with a presence or a lack of soft underfoot conditions, real time vehicle speed, vehicle acceleration, vehicle pose, vehicle payload, engine torque, engine power output, and engine RPM, and generating signals indicative of live data representing at least one of real time wheel slip ratio and real time rolling resistance for a vehicle operating at a job site. The method may further include receiving the live data at a controller, receiving, at the controller, reference data representative of soft underfoot conditions from a database, and analyzing, using a processor of the controller, the live data and the reference data. The method may still further include determining a first set of parameters including measured real time values corresponding to at least one of an image of job site surface conditions, wheel slip ratio, rolling resistance, vehicle speed, and vehicle pose, and extracting from the reference data at least one of a first data subset containing at least one of an image of job site surface conditions and vehicle operational parameters identified by an operator as being associated with soft underfoot conditions, and a second data subset containing data extracted using heuristics including identifying values for a mean rolling resistance greater than a threshold level of rolling resistance for greater than a first threshold time period, values for a vehicle speed greater than a threshold level of vehicle speed, and values for a wheel slip ratio greater than a threshold level of wheel slip ratio for greater than a second threshold time period. The method may also include building and training a model for use by a classifier that segregates data subsets from the first set of parameters into a first classification that includes parameters that characterize surfaces with soft underfoot conditions, and a second classification that includes parameters that characterize surfaces without soft underfoot conditions. The method may still further include generating control command signals that cause a change in vehicle operational parameters to reduce or avoid any effects on operation of the vehicle associated with soft underfoot conditions.

In another aspect, the present disclosure is directed to a computer-readable medium for use in a soft underfoot conditions response system to predict and respond to soft underfoot conditions. The computer-readable medium includes computer-executable instructions for performing a method for predicting and responding to soft underfoot conditions. The method may include transmitting signals from sensors mounted on the vehicle indicative of live data representing at least one of real time vehicle speed, vehicle acceleration, vehicle pose, vehicle payload, engine torque, engine power output, and engine RPM, and generating signals indicative of live data representing at least one of real time wheel slip ratio and real time rolling resistance for the vehicle operating at a job site. The method may further include receiving the live data at a controller, receiving, at the controller, reference data representative of soft underfoot conditions from a database, and analyzing, using a processor of the controller, the live data and the reference data. The method may still further include determining a first set of parameters including measured real time values corresponding to wheel slip ratio and rolling resistance, vehicle speed, and vehicle pose, and extracting from the reference data at least one of a first data subset containing vehicle operational parameters identified by an operator as being associated with soft underfoot conditions, and a second data subset containing data extracted using heuristics including identifying values for a mean rolling resistance greater than a threshold level of rolling resistance for greater than a first threshold time period, values for a vehicle speed greater than a threshold level of vehicle speed, and values for a wheel slip ratio greater than a threshold level of wheel slip ratio for greater than a second threshold time period. The method may also include building and training a model for use by a classifier that segregates data subsets from the first set of parameters into a first classification that includes parameters that characterize surfaces with soft underfoot conditions, and a second classification that includes parameters that characterize surfaces without soft underfoot conditions. The method may still further include generating control command signals that cause a change in vehicle operational parameters to reduce or avoid any effects on operation of the vehicle associated with soft underfoot conditions.

DETAILED DESCRIPTION

Figure 1:
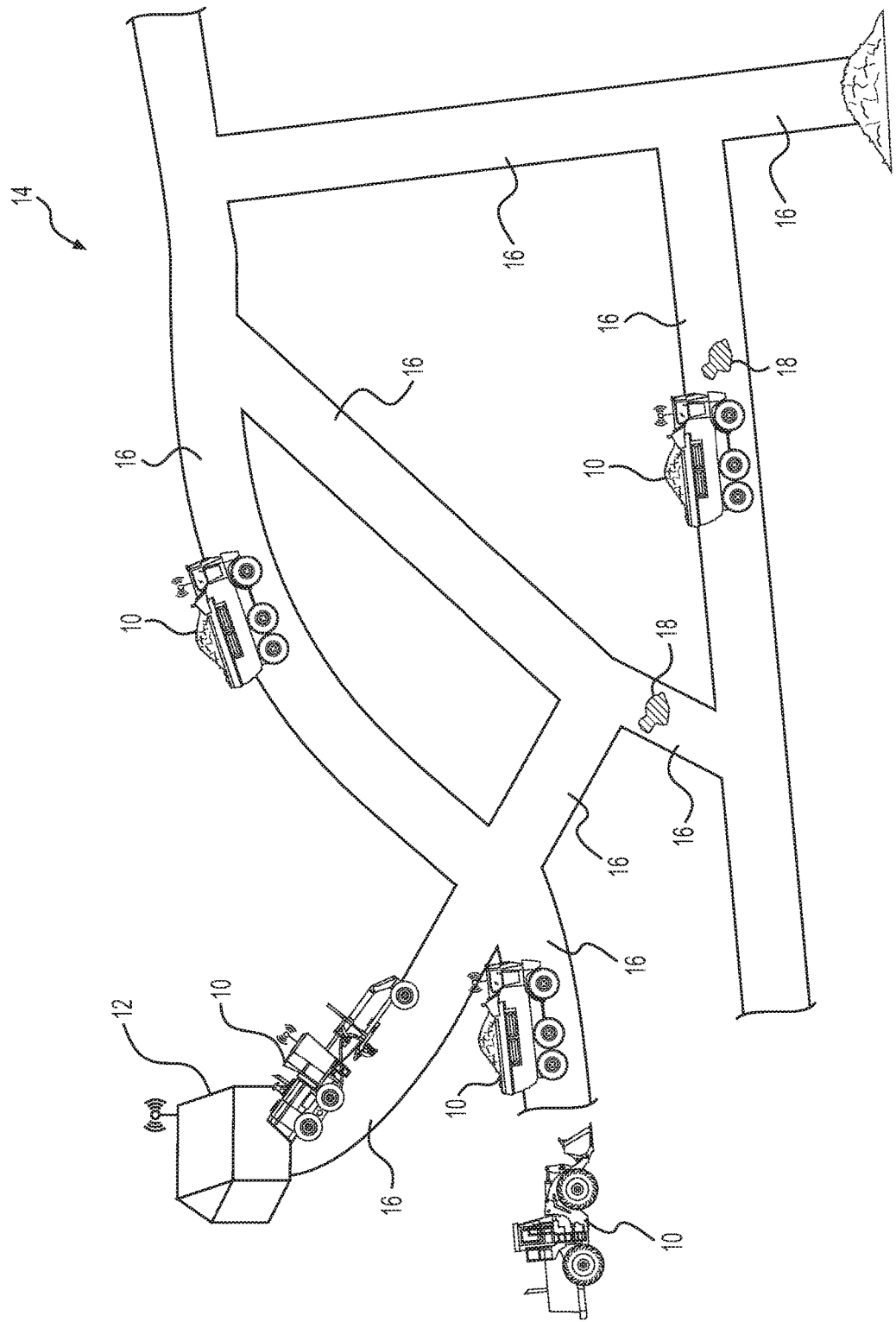
FIG. 1 is an isometric illustration of exemplary vehicles operating at a job site.

An exemplary embodiment of a vehicle 10 at a job site, such as an oil sands location, is illustrated in FIG. 1. Vehicle 10 may be, for example, an off-highway truck, a mining shovel, a wheel loader, a track loader, a backhoe, a hydraulic excavator, or any other type of machine known in the art. Vehicle 10 may include a chassis supported by a pair of front wheels and a pair of rear wheels. At least the front wheels may be steerable, and the chassis may include front and rear frame portions that may be capable of relative articulation. Vehicle 10 may include an on-board operator station, which may provide accommodations for an operator and also may house control equipment that enables vehicle 10 to be operated remotely.

FIG. 1 illustrates exemplary vehicles 10, which may travel between locations of a worksite 14 via paths 16. Vehicles 10 may be autonomous, semi-autonomous, and/or manned mobile machines that perform some type of operation associated with an industry such as mining, construction, farming, freighting, or another industry. Although autonomous vehicles 10 may be designed to operate without an operator, it should be understood that semi-autonomous vehicles 10 may or may not be designed to operate with an operator. In any case, each of the machines may be, for example, an on or off-highway haul truck, or another type of equipment, which may haul a load material. And, a vehicle 10 may be a motor grader, an excavator, a dozer, a water truck, or another type of equipment, which may repair paths 16. Alternatively, vehicles 10 may be, for example, loaders, compactors, scrapers, passenger vehicles, or other types of mobile machines.

Worksite 14 may be, for example, a mine site, a landfill, a quarry, a construction site, a ski resort, a logging site, a road worksite, or another type of worksite known in the art. Locations 12 may include buildings, dig sites, aggregate collection sites, or other locations from or to which vehicles 10 may travel. For example, a location 12 may be a dig site, an aggregate collection site, or a worksite control facility. Paths 16 may or may not include roadways that vehicle 10 regularly traverses. For example, paths 16 may be gravel roads, quarry floors, concrete bridges, or other types of paths that vehicles 10 may traverse.

In an exemplary implementation, vehicles 10 may travel between locations at an oil sands mining site, and may encounter soft underfoot conditions often experienced at oil sands mining sites. The roadways at an oil sands mining site may at times be rendered unpredictable by for example, weather conditions, usage patterns, machine load losses, natural disasters, tectonic shifts, mud slides, rock slides, and/or other deteriorative events and/or processes. These roadways may include unpredictable portions, which may increase time and/or costs associated with traveling between locations. Additionally, the unpredictable portions may disable vehicles 10 by, for example, causing vehicles 10 to slip, get stuck, deplete their energy (e.g., fuel or electric charge), or crash. Some of the unpredictable portions of paths 16 at an oil sands location may include soft underfoot condition portions 18, which may cause vehicles 10 to experience significant wheel slip and/or rolling resistance. Each soft underfoot condition location of one of vehicles 10 (hereafter "vehicle 10") may or may not affect a heading and/or location of vehicle 10. For example, the soft underfoot condition may cause vehicle 10 to fishtail, irregularly accelerate (accelerate slower than expected), or irregularly decelerate (decelerate slower than expected). Alternatively or additionally, the soft underfoot condition may cause one or more traction devices of vehicle 10 to rotate irregularly (faster or slower than expected). Additionally or in the alternative, a soft underfoot condition may result in vehicle 10 experiencing unacceptable or undesirable changes in pitch rate, yaw rate, and/or roll rate.

Soft underfoot conditions may be identified by an operator of a particular machine based on the operator's experiences when operating the same or similar machines due to various sensory inputs to the operator such as force feedback (generally referred to as haptic feedback) through various controls and/or an operator seat, visual feedback, auditory feedback, and proprioceptive feedback. Alternatively or in addition, soft underfoot conditions may be identified without any operator input, such as by comparisons of values for various signals received from sensors to predetermined threshold values. Each vehicle 10 may include a soft underfoot conditions response system 30 configured to predict, identify, avoid, and/or minimize the effects of soft underfoot condition portions 18 by changing ways in which the machine operates.

Figure 2:
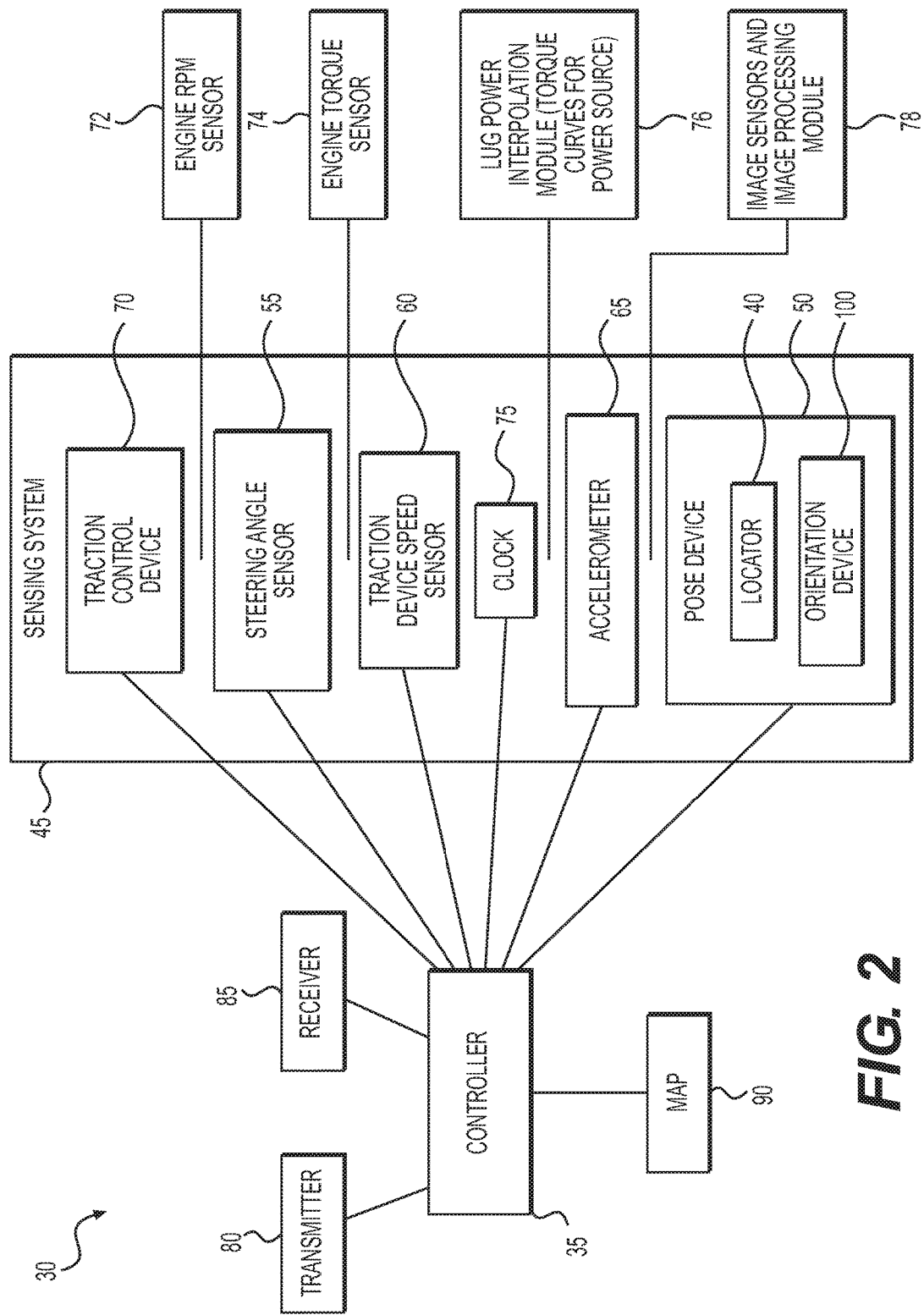
FIG. 2 is a block diagram of an exemplary soft underfoot conditions system according to an embodiment of this disclosure.

As illustrated in FIG. 2, each soft underfoot conditions response system 30 may include a controller 35, which comprises one or more processors and one or more memory devices. The various functions performed by controller 35 are enabled and implemented by various combinations of hardware and software associated with the one or more processors and one or more memory devices of controller 35, which result in special purpose structural distinctions to controller 35. Controller 35 may communicate with a locator 40 to monitor a location of vehicle 10. Controller 35 may also communicate with sensors of a sensing system 45 to monitor parameters indicative of a soft underfoot condition of vehicle 10. The sensors of sensing system 45 may be configured to sense these parameters. For example, the sensors of sensing system 45 may include a pose device 50 (a device for determining a location and an orientation), a steering angle sensor 55, a traction device speed sensor 60, an accelerometer 65, a traction control device 70, an engine RPM sensor 72, an engine torque sensor 74, a clock 75, a lug power interpolation module 76 (interpolates torque outputs from torque curves for power sources), and one or more image sensors and an image processing module 78. In some embodiments, locator 40 may be included in pose device 50. Based on signals received during communications with locator 40 and/or the sensors of sensing system 45, controller 35 may be configured to communicate with a transmitter 80 to transmit to an offboard system at least one location where vehicle 10 experienced a soft underfoot condition. For example, the offboard system may include a worksite control facility at a location 12 and/or another vehicle 10.

In some embodiments, controller 35 may also be configured to communicate with a receiver 85 to receive from an offboard system at least one location where at least one of vehicles 10 experienced a soft underfoot condition (hereafter a "known soft underfoot condition location"). For example, the known soft underfoot condition location may be a location where vehicle 10 experienced a soft underfoot condition characterized by excessive wheel slip or excessive rolling resistance. Alternatively, and in accordance with various exemplary embodiments of this disclosure, controller 35 may be configured to implement procedures to predict locations at a site with potential soft underfoot conditions, or various combinations of measured machine operational parameters indicative of a soft underfoot condition.

In one exemplary embodiment, controller 35 may be configured to group or classify data characterizing various machine operational parameters acquired empirically at a particular job site over a long period of time, by a variety of different machines, and under a large variety of different conditions. The data may be stored in one or more memory devices as a reference database, and may include values pertaining to rolling resistance, wheel slip ratio, vehicle velocity, and vehicle pose (including pitch, roll, and yaw) under different job site surface conditions and at different locations calculated for various types of vehicles operating at the job site. One or more processors of controller 35 may be configured and programmed in order to result in one or more special purpose processors that are configured to classify the data collected from each job site, with or without actual human operator input, and predict the existence of soft underfoot conditions. In various exemplary embodiments, controller 35 may be configured and programmed to analyze real time data received from various sensors on a machine, utilize machine learning techniques in order to train a classifier using the data gathered by various vehicles operating at job sites, compare the analyzed data with predetermined threshold values for various parameters, identify any trends or patterns in the real time data, and generate appropriate command control signals to change ways in which the machine operates in a manner designed to avoid or minimize any negative effects from soft underfoot conditions.

Machine learning techniques implemented by one or more processors of controller 35 may include several different approaches for evaluating the collected data. In one exemplary approach, one or more processors of controller 35 may be programmed to group historical, empirical, and/or real time data acquired by one or more machines operating at a particular job site, the data being relevant to a determination of predicted and/or actual soft underfoot conditions using a "K-Nearest Neighbor" (KNN) classification algorithm, and without relying on any input from an operator—as discussed in more detail below. In another exemplary approach, one or more processors of controller 35 may be programmed to use one or more subsets of historical, empirical, and/or real time data acquired by one or more machines operating at a particular job site to train a soft underfoot conditions classifier embodied in one or more processors of controller 35, in conjunction with operator input. The soft underfoot conditions classifier may include a classifier such as a Support Vector Machine (SVM)—discussed in more detail below.

In some situations, a known soft underfoot condition location 18 at a job site may be a location where another vehicle 10 experienced a soft underfoot condition, excessive wheel slip ratios, and/or excessive rolling resistance. Whether soft underfoot condition locations are actual locations or predicted locations based on an analysis of real time machine operational parameters, in some embodiments, controller 35 may be configured to communicate with a map 90 to store the known or predicted soft underfoot condition locations. Based on communications with locator 40 and map 90, controller 35 may be configured to react to known or predicted soft underfoot condition locations. For example, controller 35 may warn an operator of vehicle 10 of known or predicted soft underfoot condition locations. Alternatively or additionally, controller 35 may autonomously or semi-autonomously control vehicle 10 and/or arrange for cleanup and/or repair of known or predicted soft underfoot condition locations. For example, one or more processors of controller 35 may be programmed and configured to receive executable instructions from one or memory devices associated with controller 35, the executable instructions, when executed by the one or more processors causing a change in the way the machine operates semi-autonomously or completely autonomously.

Controller 35 may be configured to send command control signals to various operational devices such as solenoids, pumps, valves, motors, and switches to effect changes in gear ratios, flow rates and flow directions for various operational fluids, fuel injection timing and duration, throttle position, voltage, current, and/or power outputs associated with various electrical power sources, ignition timing, brake controls, and/or steering controls. In some instances, the command control signals from controller 35 may cause vehicle 10 to be re-routed along another path 16. Alternatively or in addition, controller 35 may be configured to adjust machine speed, braking characteristics, drive train gear ratios, power output, or other operating characteristics or parameters of vehicle 10. In some embodiments, controller 35 may adjust a steering angle of vehicle 10 in response to a determination of an actual or predicted soft underfoot condition. Alternatively, or in addition, controller 35 may be configured to manipulate a work implement of vehicle 10, adjust the functioning of an object detection system, adjust the functioning of a stability control system, and/or adjust operational parameters for another system or subsystem of vehicle 10.

Pose device 50 may determine a location and an orientation of vehicle 10 relative to a local reference point, a coordinate system associated with worksite 14, a coordinate system associated with Earth, or another type of fixed coordinate system. Pose device 50 may include locator 40 to determine the location of vehicle 10 and an orientation device 100 to determine the orientation of vehicle 10.

Locator 40 may receive and analyze high-frequency, low power radio or laser signals from multiple locations to triangulate a relative location. For example, locator 40 may include an electronic receiver configured to communicate with one or more satellites, or a local radio or laser transmitting system to determine a relative 3-D location of vehicle 10. Alternatively or additionally, locator 40 may include one or more Global Positioning System (GPS) sensors, an Inertial Reference Unit (IRU), odometric or dead-reckoning positioning device, or another known locating device operable to receive or determine a relative 3-D location of vehicle 10. Locator 40 may generate and communicate to controller 35 a signal indicative of the location of vehicle 10 in a local or global coordinate system.

Orientation device 100 may include laser-level sensors, tilt sensors, inclinometers, or other known devices operable to determine a relative pitch, changes in pitch rate, relative yaw, changes in yaw rate, and/or relative roll, or changes in roll rate of vehicle 10. Orientation device 100 may also include a radio direction finder, a gyrocompass, a fluxgate compass, or another known device operable to determine a relative orientation of vehicle 10. Orientation device 100 may generate and communicate to controller 35 a signal indicative of a heading of vehicle 10 with respect to a local or global coordinate system.

Steering angle sensor 55 may determine a steering angle of vehicle 10. This steering angle may be measured with respect to a heading of vehicle 10. Steering angle sensor 55 may generate and communicate to controller 35 a signal indicative of the determined steering angle with respect to the heading.

Traction device speed sensor 60 may determine speeds of one or more traction devices of vehicle 10 (hereafter the "traction device speed of vehicle 10"). For example, the one or more traction devices may be in the form of tracks or wheels. Traction device speed sensor 60 may generate and communicate to controller 35 a signal indicative of the determined traction device speed of vehicle 10.

Accelerometer 65 may determine an acceleration of vehicle 10 with respect to a coordinate system. Accelerometer 65 may generate and communicate to controller 35 a signal indicative of the determined acceleration of vehicle 10.

Traction control device 70 may modify an amount of braking power supplied to each traction device of vehicle 10 to enhance traction and help reduce the effect of soft underfoot condition portions 18. Traction control device 70 may also modify an amount of driving power supplied to each traction device of vehicle 10 to enhance traction and help reduce the effect of soft underfoot condition portions 18. To maintain a certain minimum amount of traction, traction control device 70 may supply a certain amount of braking power and/or driving power. Traction control device 70 may generate and communicate to controller 35 a signal indicative of this certain amount of braking power and/or driving power.

Clock 75 may periodically communicate a signal indicative of a time to other soft underfoot conditions response system 30 components. These components may append the time to information communicated to controller 35. Controller 35 may use the appended time to synchronize received information from several components. For example, controller 35 may synchronize by time the steering angle of vehicle 10 with the traction device speed of vehicle 10. Controller 35 may be programmed to combine temporal data received from clock 75 with other data received from additional sensors or derived from additional sensor data. For example, controller 35 may be configured to set threshold values for a length of time during which a determined wheel slip ratio is measured, a length of time during which a determined rolling resistance is measured, and time periods during which certain machine pose information such as pitch, yaw, and roll in excess of predetermined thresholds are measured.

Transmitter 80 may transmit, through a communications link, signals to a worksite control facility, another vehicle 10, or another offboard system. Transmitter 80 may include hardware and/or software that enables transmitter 80 to transmit the signals through the communications link. The signals may include satellite, cellular, infrared, radio, and/or other types of wireless communication that enable transmitter 80 to transmit the signals to offboard systems. Alternatively, the signals may include electrical, optical, and/or other types of wired communication that enable transmitter 80 to transmit the signals to offboard systems.

Receiver 85 may receive, through a communications link, signals from a worksite control facility, another vehicle 10, or another offboard system. Receiver 85 may include hardware and/or software that enables receiver 85 to receive the signals through the communications link. The signals may include satellite, cellular, infrared, radio, and/or other types of wireless communication that enable receiver 85 to receive the signals from offboard systems. Alternatively, the signals may include electrical, optical, and/or other types of wired communication that enable receiver 85 to receive the signals from offboard systems. The signals may be indicative of known soft underfoot condition locations. Receiver 85 may generate and communicate to controller 35 a signal indicative of these known soft underfoot condition locations.

Map 90 may be electronic in form and may be stored in the memory of controller 35, a memory of another vehicle 10, and/or a memory of a worksite control facility. Map 90 may serve as a repository for known soft underfoot condition locations. In other words, known soft underfoot condition locations may be stored in map 90. Map 90 may be updated by controller 35, a controller of another vehicle 10, a controller of worksite control facility 17, or another component capable of updating map 90. This updating may be direct or by way of communications between one or more vehicles 10 and/or worksite control facility 17. The updating may include adding known soft underfoot condition locations to or removing known soft underfoot condition locations from map 90.

Oil sands at an exemplary work site 14 are typically either loose sand or partially consolidated sandstone containing a naturally occurring mixture of sand, clay, and water, saturated with a dense and extremely viscous form of petroleum. These environments present a number of challenges for autonomous navigation, vehicle slip and high rolling resistance being two amongst many. Vehicle wheel slip ratios and rolling resistance together are indicative of soft underfoot conditions. Under these conditions, vehicle 10 may have trouble moving if rolling resistance is high, or may slip in its current place if wheel slip ratio is large.

A system and method according to various embodiments of this disclosure predicts whether a surface underneath vehicle 10 may have characteristics that potentially demonstrate the existence of soft underfoot conditions. The prediction may be based, at least in part, upon values of various vehicle operational parameters as determined from the signals provided by various sensors associated with sensing system 45. Upon determining the potential existence of soft underfoot conditions, or in some implementations, a trend in vehicle operational parameters indicative of an approaching or existing soft underfoot conditions location, controller 35 may be programmed to take the necessary actions to avoid any potential detrimental effects of the soft underfoot conditions.

In some exemplary embodiments, one or more processors of controller 35 may be programmed to group historical, empirical, and/or real time data acquired by one or more machines operating at a particular oil sands mining site, the data being relevant to a determination of predicted and/or actual soft underfoot conditions. As mentioned above, in an exemplary implementation, the one or more processors may be programmed to use a "K-Nearest Neighbor" (KNN) algorithm, without relying on any input from an operator. Alternatively or in addition, the one or more processors of controller 35 may be programmed to use one or more subsets of historical, empirical, and/or real time data acquired by one or more machines operating at the job site to train a soft underfoot conditions classifier, in conjunction with operator input.

The soft underfoot conditions classifier may be a Support Vector Machine (SVM), and the data may include various sensory data received by controller 35 from sensing system 45 and used in calculating rolling resistance and wheel slip ratios. The sensor data may also include machine velocity, pitch, yaw, and roll received from orientation device 100. The sensory data acquired by controller 35 may be used to compute features to train a soft underfoot classifier model. Once a classifier model has been generated, the algorithm may be tested on actual reference data acquired by machines operating at a representative site such as an oil sands mining location.

In an exemplary embodiment of the present disclosure, a data truck running at an oil sands mining site may be utilized to collect live data for oil sands conditions. The expectation is that this historical, empirical, and real time data is representative of soft underfoot conditions that are typically seen at oil sands mining sites. Operator input provided by various operators of various machines operating at the mining sites, and particularly operator input from experienced operators, may also be collected over time and used by controller 35 as further input in identifying and classifying areas and associated machine operational parameters indicative of soft underfoot conditions.

Machine learning techniques programmed into one or more processors of controller 35 may include training a machine learning classifier using data representative of vehicle operational parameters indicative of soft underfoot conditions (also referred to herein as data representative of soft underfoot conditions) as well as data representative of vehicle operational parameters that are not indicative of soft underfoot conditions (also referred to herein as data that is not representative of soft underfoot conditions.) Controller 35 may be configured and programmed to extract viable data from amongst an entire set of data acquired from historical, empirical, and/or real time data provided by sensors and/or operators of various machines that have operated at one or more particular sites such as a particular oil sands mining site. Controller 35 may employ various heuristics, or techniques for finding approximate solutions when classic methods are unable to find an exact solution. The heuristics aid in the identification of data subsets that may or may not represent soft underfoot conditions.

Examples of some heuristics that may be used by controller 35 to extract data subsets representative of soft underfoot conditions may include: a determination that a mean rolling resistance is greater than 15% for a time duration of greater than 10 seconds; a determination that a vehicle is moving at a velocity greater than 1 meter/second; and a determination that a wheel slip ratio is greater than 0.3 for a time duration of greater than 1 second.

Examples of some heuristics that may be used by controller 35 to extract data subsets that are not representative of soft underfoot conditions may include: a determination that a mean rolling resistance is less than 10% for a time duration of greater than 10 seconds; a determination that a vehicle is moving at a velocity greater than 1 meter/second; and a determination that a wheel slip ratio is less than 0.3 for a time duration of greater than 1 second.

In one exemplary embodiment, controller 35 may be configured and programmed to include a machine learning algorithm that has been trained using computed features from data extracted using at least some of the exemplary heuristics discussed above. A sliding window approach may be used, and features such as the mean value of rolling resistance, the mean value of rear wheel slip ratio, the mean velocity of the vehicle, the variance in vehicle roll, the variance in vehicle pitch, and the variance in vehicle yaw may be estimated for every 1 second of data that is extracted (where the size of the sliding window is set to 1 second.) Once selected features are computed, they may be normalized by subtracting values for each of the dimensions of a particular feature from the mean values for the dimension and dividing by twice the standard deviation of the values. The normalization may be done for each feature dimension.

The simplest solution to a KNN algorithm is to compute the distance from a query point to every other point in the database, keeping track of the "best so far". This algorithm, is sometimes referred to as the "naïve" approach. There are no search data structures to maintain, so linear search has no space complexity beyond the storage of the database. Naive search can, on average, outperform space partitioning approaches on higher dimensional spaces. A "naïve" way of using a KNN algorithm performed by controller 35 may use Euclidean distance as a similarity metric with one neighbor.

When evaluating different settings for estimators, there is a risk of overfitting a test set because the parameters can be tweaked until the estimator performs optimally. In this way, knowledge about the test set can "leak" into the model and evaluation metrics may no longer report on generalized performance. To solve this problem, yet another part of the dataset can be held out as a so-called "validation set". Training may proceed on the training set, after which evaluation may be done on the validation set, and when the experiment seems to be successful, final evaluation can be done on the test set. However, by partitioning the available data into three sets, the number of samples that can be used for learning by the model may be significantly reduced, and the results may depend on a particular random choice for the pair of training and validation sets of the data.

A solution to this problem is a procedure called cross validation (CV for short). A test set should still be held out for final evaluation, but the validation set is no longer needed when doing CV. In the basic approach, called k-fold CV, the training set is split into k smaller sets. For each of the k "folds", a model is trained using the k folds as training data. The resulting model is validated on the remaining part of the data (i.e., it is used as a test set to compute a performance measure such as accuracy). The performance measure reported by k-fold cross-validation is then the average of the values computed in the loop. This approach can be computationally expensive, but does not waste too much data (as is the case when fixing an arbitrary test set). This provides a major advantage where the number of samples is very small.

Figure 3:
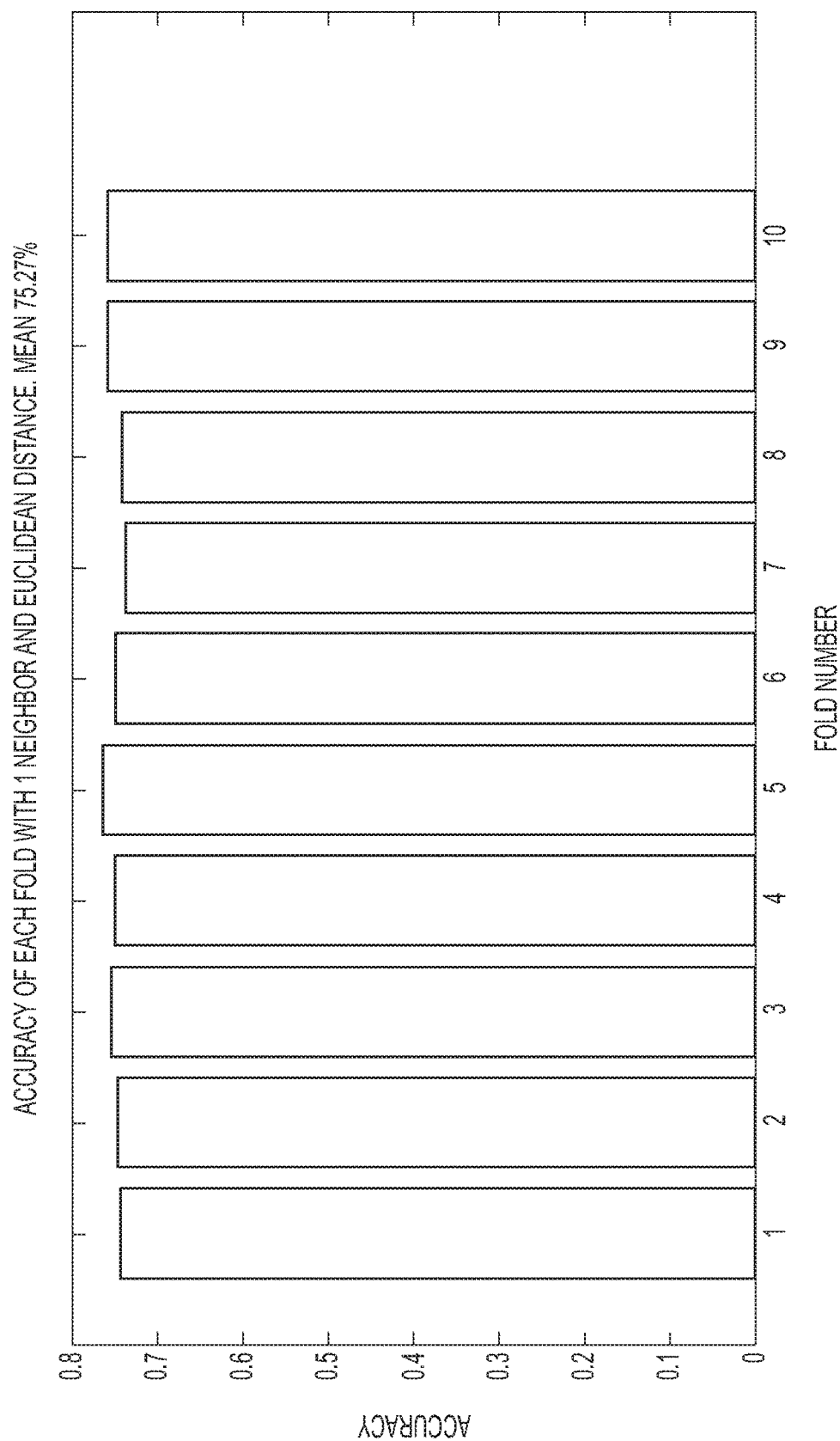
FIG. 3 is a bar chart illustrating the results of a ten-fold cross-validation of a subset of data representative of soft underfoot conditions as extracted by a classifier according to an embodiment of this disclosure.
Figure 4:
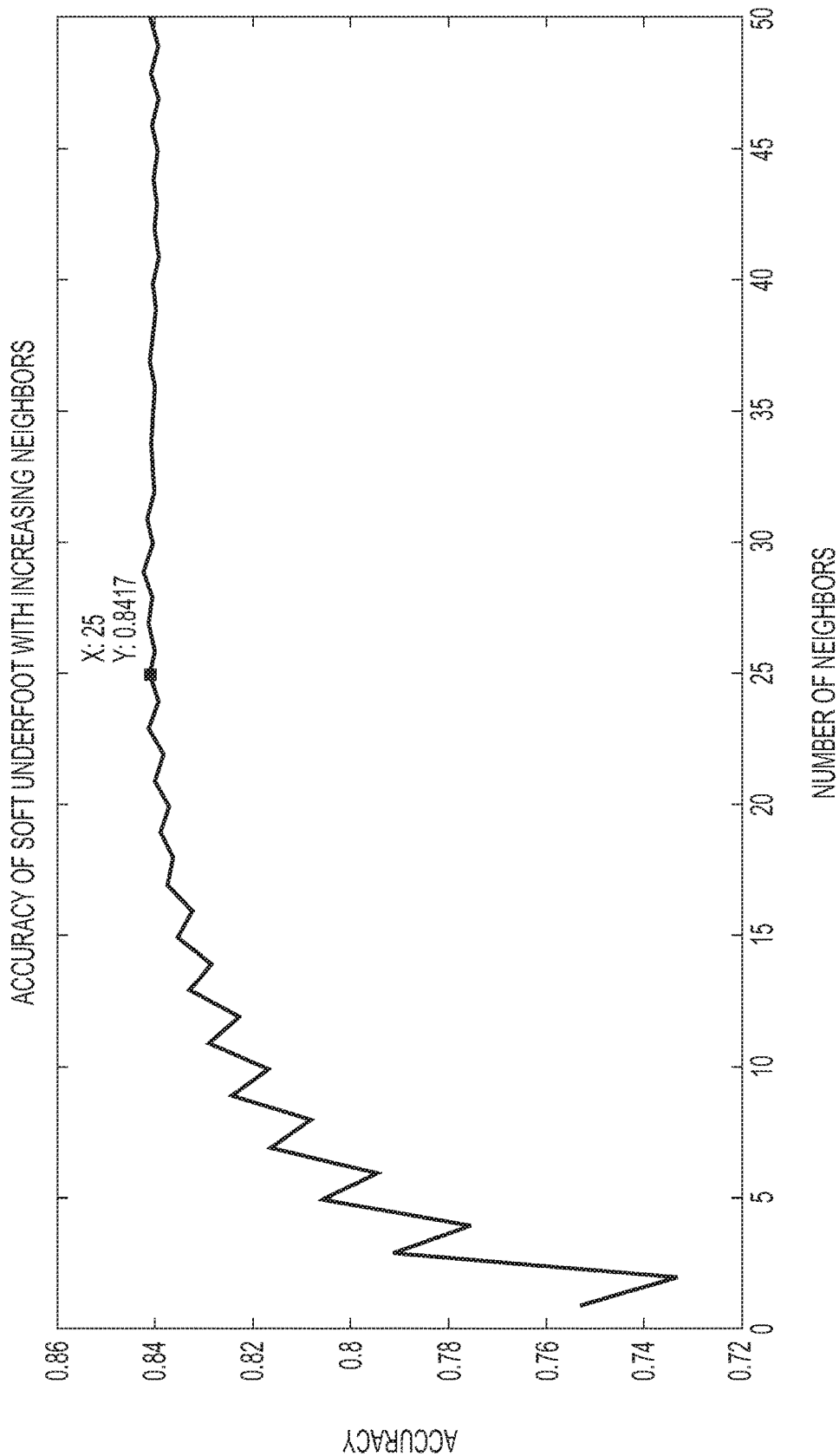
FIG. 4 is a graph illustrating the accuracy of the classifier cross-validated in FIG. 3.

The results of an exemplary 10 fold cross-validation performed on a subset of data characterizing soft underfoot conditions at an oil sands mining site are shown in FIG. 3. The mean accuracy of each fold with one neighbor and using the Euclidean distance with the one neighbor was 75.27%, and most folds were in the same range. As illustrated in the graph of FIG. 4, increasing the number of neighbors only increases the accuracy up to a certain fixed number of neighbors, beyond which increasing the number of neighbors has very little impact on classification accuracy. To avoid overfitting, a value of 25 neighbors was chosen in the exemplary implementation characterized by FIGS. 3 and 4.

Having chosen the number of neighbors, different similarity metrics may then be compared. The different metrics to be compared may include: a) Euclidean Distance; b) Chebychev; c) Cityblock; d) Correlation; and e) Cosine. Only the outputs of 10 fold cross-validation using 25 neighbors with Euclidean Distance similarity metrics are illustrated in FIGS. 3 and 4. The results of using 25 neighbors and different similarity metrics are compiled in Table 1 below:

TABLE 1

Summary of attained accuracies using different distance metrics for KNN

| Distance Metric | Accuracy (%) |
| --- | --- |
| Cosine | 81.68 |
| Correlation | 81.61 |
| Cityblock | 84.40 |
| Chebychev | 83.97 |
| Euclidean | 84.17 |

Figure 5:
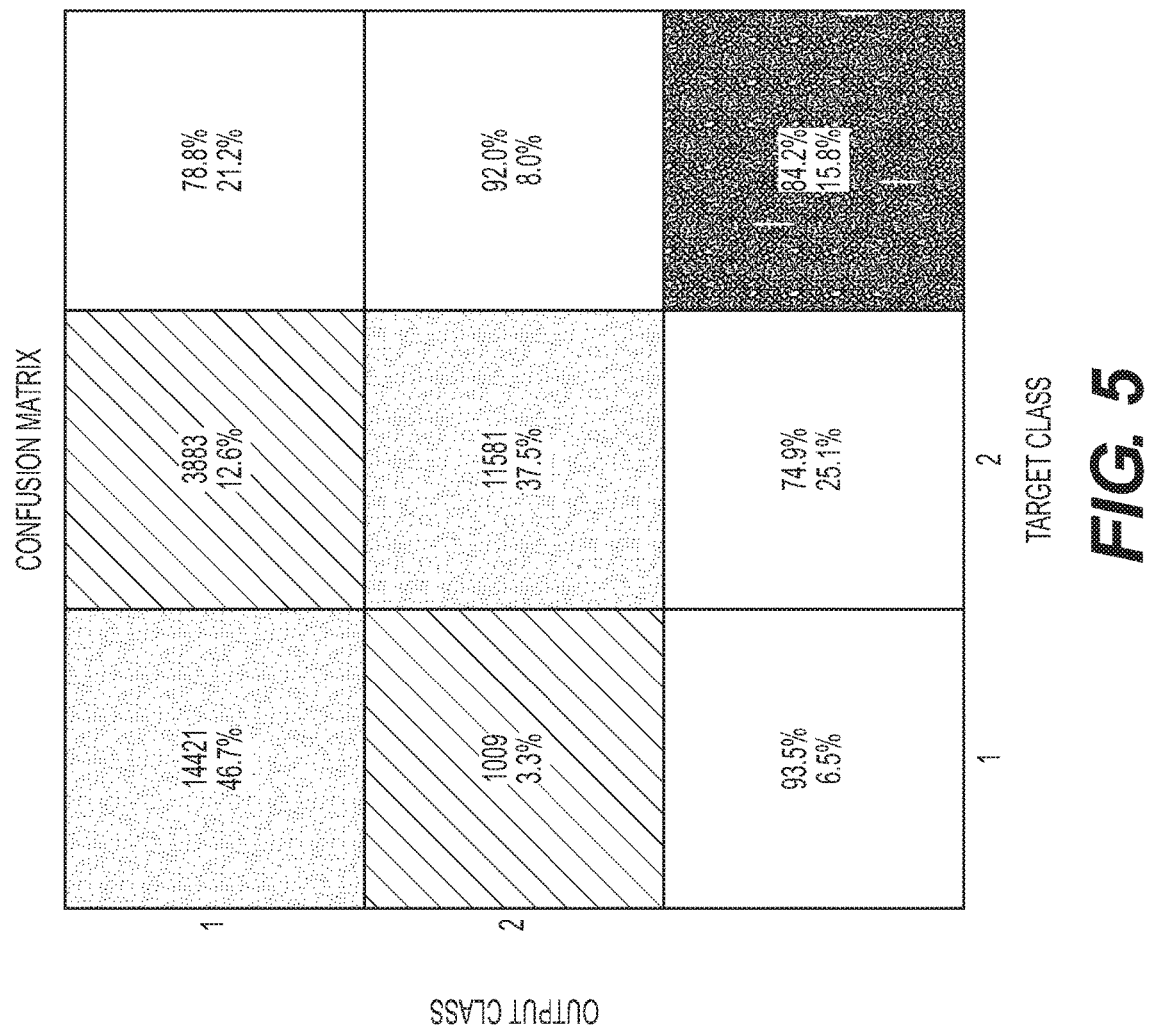
FIG. 5 is a confusion matrix attained by using 25 neighbors and a nearest neighbor search classifier with euclidean distance as a similarity metric.

In one exemplary implementation of the KNN algorithm for classification, the standard Euclidean distance may be used as the chosen classifier similarity metric to generate a "confusion matrix". FIG. 5 shows a confusion matrix attained by using 25 neighbors and a nearest neighbor search classifier with Euclidean distance as a similarity metric. In the field of machine learning, and specifically the problem of statistical classification, a confusion matrix, also known as an error matrix, is a specific table layout that allows visualization of the performance of an algorithm, typically a supervised learning application (in unsupervised learning it is usually called a matching matrix). Each column of the matrix represents the instances in a predicted class while each row represents the instances in an actual class (or vice versa). The name stems from the fact that it makes it easy to see if the system is confusing two classes (i.e. commonly mislabeling one as another).

In FIG. 5, output class 1 represents soft underfoot conditions while output class 2 represents normal conditions. It can be observed that the classifier classified soft underfoot conditions accurately 93.5% of times while the classification accuracy of normal conditions was 74.9%. Overall, the classifier had 84% accuracy.

When using a support vector machine (SVM) as a soft underfoot conditions classifier, in one exemplary implementation, a simple SVM may be used without any optimization. The results of a simple SVM without optimization according to an exemplary implementation of this disclosure were comparable to the results obtained using the KNN algorithm. A 10 fold cross validation output of a SVM was found to have a mean classification accuracy of 80.96%, without optimization.

A method according to an exemplary implementation of this disclosure estimates coefficients of rolling resistance for a vehicle operating on a surface with potential soft underfoot conditions. In one example, the method uses forces experienced by an autonomous mining truck during navigation at an oil sands mining site. The exemplary implementation of a method for estimating coefficients of rolling resistance uses a model based rolling resistance estimator configured to model physical forces exerted and experienced by the truck during navigation. These forces are computed using series of interpolations based on empirical data, as well as real time data acquired by sensors mounted on the truck. The estimated forces are primarily vehicle rimpull force (maximum traction force under different driving modes), ground resistance forces, and rolling resistance forces.

Rolling resistance estimation is largely based on the second law of motion:

$$F = ma \qquad (1)$$

where F is Force, m is mass and a is acceleration. For an autonomous truck, these motion forces can be modelled using equation 2:

$$F_i = F_{rm} - F_g - F_r - F_a \qquad (2)$$

where $F_i$ is inertial force, $F_{rm}$ is the truck's rimpull force, $F_g$ is force due to ground resistance, $F_r$ is force due to rolling resistance, and $F_a$ is force due to air drag. Equation 2 can be further expanded as shown below in equation 3:

$$m_e a_x = F_{rm} - mg \sin\theta - C_r mg \cos\theta - \tfrac{1}{2}\rho_a c_d A_a V_r^2 \qquad (3)$$

where $m_e$ is the effective mass of the truck, $a_x$ is truck acceleration, m is the mass of the truck, g is acceleration due to gravity, $\theta$ is surface grade, $C_r$ is the coefficient of rolling resistance, $\rho_a$ is the air mass density, $c_d$ is the air drag coefficient, $A_a$ is the effective area of vehicle, and $V_r$ is the vector sum of wind velocity and vehicle velocity with respect to the road.

Equation 3 can be rewritten to estimate Coefficient of Rolling resistance $C_r$:

$$C_r = \frac{F_{rm} - mg\sin\theta - \frac{1}{2}\rho_a c_d A_a V_r^2 - m_e a_x}{mg\cos\theta} \qquad (4)$$

Since the off-road vehicle at a job mining site does not travel at very high speeds, effects of air drag are negligible. Further, rolling resistance may be estimated only during steady state conditions (constant velocity and near zero acceleration). Neglecting effects of air drag and maintaining steady state, equation 4 simplifies to equation 5:

$$C_r = \frac{F_{rm} - mg\sin\theta}{mg\cos\theta} \qquad (5)$$

$F_{rm}$ is calculated using known relationships between $F_{rm}$ and Engine RPM ($N_{eng}$) for a given gear, i.e., $$F_{rm} = L_{Di}(N_{eng}) \qquad (6)$$

Figure 6:
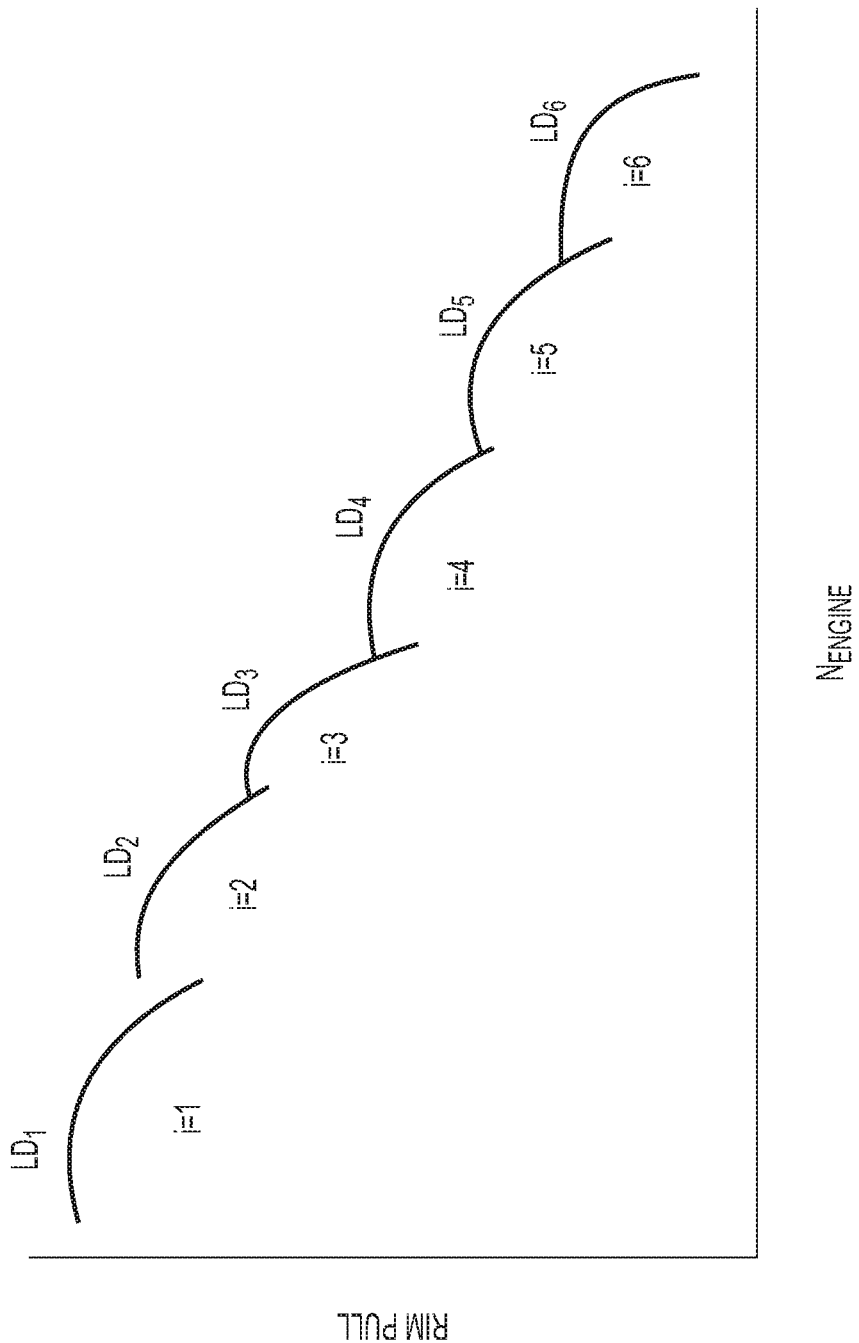
FIG. 6 is an exemplary graph illustrating the relationship between rim pull and engine RPM for different gears (i) of a vehicle.

$L_{Di}(N_{eng})$ is a function that outputs $F_{rm}$ for a vehicle in direct drive mode and gear i. The function models a relationship between expected rimpull force $F_{rm}$ and Engine RPM ($N_{eng}$). A figurative description of the relationship between $F_{rm}$ and $N_{eng}$ for a given gear i is shown in FIG. 6.

To calculate coefficient of rolling resistance in all driving conditions, acceleration effects may be incorporated into the estimate. The effects of air drag can be neglected. Hence, under those circumstances, equation 3 can be rewritten to estimate Coefficient of Rolling resistance $C_r$ as:

$$C_r = \frac{F_{rm} - mg\sin\theta - m_e a_x}{mg\cos\theta} \qquad (7)$$

Vehicle rimpull force is required to estimate rolling resistance. The vehicle typically has two modes of operation, direct drive and torque converter mode.

The methods to calculate rimpull force differ in both modes. However, for either direct drive mode or torque converter mode, engine loss models may be utilized for the particular vehicle being operated at the site with potential soft underfoot conditions, and the engine losses may be populated at each level through the engine transmission model.

Calculating rimpull force in direct drive may involve a series of interpolations based on empirically observed data. Lug power may be estimated through interpolations (from torque curves for the power source), and then a lug ratio ($L_r$) may be estimated using equation 8:

$$L_r = \frac{T * N * .10472}{L} \qquad (8)$$

where, T is engine torque, N is engine RPM and L is lug power attained through interpolations. In some exemplary implementations, Rimpull Force $F_{rm}$ may be estimated if $L_r$ is greater than 0.95. Rimpull Force $F_{rm}$ may be estimated through interpolations on precomputed empirical rimpull forces for direct drive, at a given gear, and at a given engine rpm.

Calculating rimpull force in torque converter mode involves many more steps than direct drive, and interpolations occurring at each level of the transmission model. Torque at each level of the transmission may be estimated, and individual losses may be accounted for at each level. These torques are attained via a series of interpolations using empirical data. Final forces may be attained by equation 9:

$$F_{rm} = \frac{T_{rm}}{R} \qquad (9)$$

where, $F_{rm}$ is rimpull force, $T_{rm}$ is rimpull torque attained after a series of interpolations, and R is rolling Radius.

In accordance with an exemplary implementation of this disclosure, a data truck running at a particular oil sands mining site was used to collect live data representative of vehicle operational parameters when running on oil sands surface conditions. The expectation was that this data would be representative of soft underfoot conditions that are typically seen in oil sands. Operator input was also used to determine areas with soft underfoot conditions. Controller 35 was configured to implement machine learning techniques, including both a KNN classification algorithm and a SVM classifier, as described above, and the machine learning classifier was used to compute rolling resistance over a large dataset collected over a period of six months. The rolling resistance estimation method underwent algorithm modifications, parameter tunings, operation condition modifications and iterative tuning over the six month period using collected data as well as preexisting data from other typical oil sands mining sites. The evaluation was performed on the six months of data acquired using cloud infrastructure with a non-cloud actual processing time of 200 hours per evaluation.

INDUSTRIAL APPLICABILITY

The disclosed embodiments of a soft underfoot conditions response system 30 may be used for predicting and responding to soft underfoot conditions experienced by vehicles operating at different sites and under different operating conditions. Similarity-based information retrieval and modeling, and database and modeling technologies can infer surface conditions, vehicle properties, and vehicle operational parameters. The vehicle operational parameters may include, for example, wheel slip ratios, rolling resistance, vehicle speed, and vehicle pose, among other properties and parameters characterizing various vehicles operating at various job sites. Reference data representative of the vehicle properties and operational parameters collected from similar previously analyzed vehicles may be stored in a database. Measurable properties and operational parameters of the vehicles may be stored in one or a plurality of databases including multi-dimensional databases. While exact matches to reference data may not be expected in response to a query for a similar vehicle given a target vehicle under investigation, an automated search strategy or algorithm may utilize various machine learning techniques to provide the best possible approximations and predictions. The machine learning techniques may include locating nearest neighbor items, or items within a specified neighborhood, with the most similar properties, from a reference collection, and utilize any geographic or other information associated with these items to predict properties and vehicle operating surface conditions. A first query for a particular vehicle may be followed by another query about that vehicle or another vehicle. Models may then be generated and utilized to predict properties, surface conditions, and operational parameters of a vehicle from the similar data.

Soft underfoot conditions response system 30 according to various implementations of this disclosure may be embodied in a computing system such as an electronic control unit (ECU) associated with any vehicle operating at a job site that may include soft underfoot conditions. The disclosed apparatus and method for predicting and responding to soft underfoot conditions may provide control command signals to a completely autonomous or semi-autonomous vehicle, or information to an operator of a vehicle. The soft underfoot conditions response system may have any number or combination of computing elements enabling it to communicate, store, and process data to carry out the disclosed techniques. For example, soft underfoot conditions response system 30 may embody a server computer or a collection of server computers configured to perform the described techniques.

The soft underfoot conditions response system may interact and communicate with other elements, such as a mobile device used by an operator or other personnel to determine potential changes to vehicle operational parameters in response to soft underfoot conditions. Depending upon the embodiment, a system may include one or more computing systems that each have different roles, perform different functions, or assume different degrees of involvement in carrying out the disclosed techniques. For example, some functions of the system may be performed offboard the machine in a "server-based" environment or a "cloud" environment that performs the disclosed soft underfoot conditions monitoring techniques as part of a service over a network. In such a server or cloud environment, an offboard soft underfoot conditions response system (i.e., the server or "cloud"), for example, may receive information on soft underfoot conditions from one or more mobile devices over a wired or wireless network. The offboard system may then process the data received from the sensing system, vehicle mounted sensors, and reference databases to determine the potential occurrences of soft underfoot conditions, and return results to the one or more mobile devices over the network. The data received from the sensing system and sensors mounted on a vehicle may be data representative of soft underfoot conditions or data not representative of soft underfoot conditions. Thus, in a server or cloud environment, the more resource intensive and complicated computations associated with processing and classifying the data may be performed in the server or cloud environment, while a relatively simple mobile device may operate as a light-weight portal (e.g., application or browser) that allows an operator to access the results output by the soft underfoot conditions response system over a network. Alternatively, the data processing may be performed in a "client-side" environment in which a mobile device performs the bulk of the processing locally.

A mobile device used by a machine operator or other personnel, or a computing system onboard the machine may include software applications (e.g., "apps"), including one or more applications used by the soft underfoot conditions response system for vehicle operations data capture, data processing, and notification of the likely existence of soft underfoot conditions or generation of control commands. The computing system may have any number or combination of computing elements or modules enabling it to communicate, store, and process data to carry out the disclosed techniques. The various computing systems onboard the machine, on a mobile device, or at an offboard, wayside, or back office location may communicate with each other over wired or wireless networks. The networks may represent any type or combination of electronic communication network(s) configured to communicate data between nodes connected to the network. For example, networks configured to communicatively couple various computing systems of soft underfoot conditions response system 30 may include the Internet, an Ethernet, a local area network (LAN), a wide area network (WAN), a personal area network (PAN), cellular network, a public switched telephone network (PSTN), or any combination thereof. In some embodiments, a network may include a mobile network and related infrastructure operable to provide Internet connectivity to a mobile device, such as a $2^{nd}$ Generation (2G) cellular communication network, a $3^{rd}$ Generation (3G) cellular communication network, a $3^{rd}$ Generation Long Term Evolution (LTE) network, or a $4^{th}$ Generation (4G) cellular communication network.

One or more processors included in the one or more computing systems that make up soft underfoot conditions response system 30 according to various disclosed implementations may embody any general-purpose or special-purpose computer microprocessor configured and programmed to execute computer program instructions, algorithms, applications, or programs stored in a main memory and/or in an onboard or external storage device.

Various memory modules may include, for example, a random access memory (RAM) or other type of dynamic or volatile storage device or non-transitory, computer-readable medium.

The soft underfoot conditions response system 30 may also include an optical system that may embody any image-detection device, including one or more image sensors and an image processing module 78 mounted to or otherwise associated with the vehicle 10, another machine, an offboard imaging station, or a mobile device that captures a digital image of an area where the vehicle is or will be operating. The optical system may be configured to irradiate the desired area of a soft underfoot condition portion 18 where a vehicle is operating in a variety of different translational and rotational positions of the machine. The one or more image sensors and image processing module 78 may be configured to capture target images of the desired area and communicate the target images to one or more image processors of sensing system 45 onboard the vehicle or offboard at one or more locations.

The one or more image processors of sensing system 45 may be configured to receive the target images from the one or more image sensors and analyze the target images. Analysis of the target images may include determining a feature set that characterizes the target image. The image processor may also be configured to retrieve a reference image from a memory. The reference image may include images of job site surfaces having features and characteristics associated with soft underfoot conditions or the lack thereof. A library or database of these reference images may be pre-recorded and stored in one or more memories, onboard a vehicle, or offboard at a back office or other locations. The reference images may be obtained under a variety of different lighting conditions, environmental conditions, translational positions of the machine, or rotational positions or orientations of the machine. The library may be continually updated based on data received from different vehicles and machines operating at various job sites under a large variety of different circumstances and operating conditions.

The image processor may be configured to build and train a model for use by a classifier that segregates feature sets determined from a plurality of target images into a first classification that includes features that characterize a portion of an image including the surface conditions that often accompany a soft underfoot condition location. This first classification of target images is therefore characterized by data representative of soft underfoot conditions. The classifier may also segregate feature sets determined from a plurality of target images into a second classification that includes features that characterize a portion of the image including the surface conditions that generally accompany surfaces that do not include soft underfoot conditions. This second classification of target images is therefore characterized by data that is not representative of soft underfoot conditions. Examples of the types of features that may be extracted by the image processor from target images and from reference images may include directional changes in image intensity for one or more localized cells that each contain a plurality of pixels of the image; edges, or points where there is a boundary between two image regions; corners or other interest points on the image; blobs or regions of interest; and ridges, such as may be present in an image of an elongated object along an axis of symmetry. Feature detection may provide attributes for localized cells that each contain a plurality of pixels of the image. These attributes may include edge orientation, directional changes in image intensity, gradient magnitude in edge detection, and the polarity and the strength of a blob in blob detection.

The soft underfoot conditions response system in accordance with various implementations of this disclosure may also include a notification module. The notification module may be configured to notify an operator of the machine or other personnel or parties when the image processor classifies a new target image as falling within a classification indicating a potential soft underfoot condition.

As discussed above, soft underfoot conditions response system 30 may be configured to include a KNN (K-Nearest Neighbor) classification algorithm, and/or a Support Vector Machine (SVM) classifier. The SVM is a supervised learning model with associated learning algorithms that may assign new feature sets to data extracted from new data sets acquired by sensing system 45 and/or data extracted from reference data sets acquired from one or more databases. The classification of the newly acquired data from sensing system 45 may be into one category or another. For example, when determining whether a new set of data including values for rolling resistance, wheel slip ratio, vehicle velocity, and vehicle pose is indicative of a vehicle operating on a surface with soft underfoot conditions or without soft underfoot conditions, the SVM may map the extracted feature set from the new set of data into a classification that indicates the likely presence of soft underfoot conditions, or a classification that indicates no soft underfoot conditions are present.

Soft underfoot conditions response system 30 may provide a notification to an operator or other personnel based on the results of the classification. Alternatively or in addition, controller 35 of soft underfoot conditions response system 30 may be configured to generate and transmit command control signals to various vehicle systems or subsystems to cause changes in the operation of the vehicle that enable a semi-autonomous or fully autonomous vehicle to avoid or diminish any adverse effects from the soft underfoot conditions. As discussed above, command control signals generated by controller 35 may include control signals that are transmitted to various solenoids, pumps, valves, motors, and switches to effect changes in gear ratios, flow rates and flow directions for various operational fluids, fuel injection timing and duration, throttle position, voltage, current, and/or power outputs associated with various electrical power sources, ignition timing, brake controls, and/or steering controls. In some instances, the command control signals from controller 35 may cause vehicle 10 to be re-routed along another path 16. Alternatively or in addition, controller 35 may command adjustments to vehicle speed, braking characteristics, drive train gear ratios, power output, or other operating characteristics or parameters of vehicle 10. In some embodiments, controller 35 may adjust a steering angle of vehicle 10 in response to a determination of an actual or predicted soft underfoot condition.

One or more libraries of feature sets characteristic of reference soft underfoot conditions locations or the operational behavior of vehicles operating at such locations may be stored in one or more memories of the system. Each of these libraries may include a collection of data acquired over a period of time from a variety of vehicles being operated in a variety of different conditions. A classifier such as the KNN algorithm or the SVM model may be trained and constantly improved, either in real time, or at times when the vehicle is idle and monitoring for soft underfoot conditions is not being performed. As feature sets are extracted from more and more reference sets of data, the library of feature sets that are used for training the classifier model increases, and the model becomes more and more robust. As a result, the ability of the model to accurately classify new data sets as either indicating the presence of soft underfoot conditions, or not, continually improves.

Any notifications generated by soft underfoot conditions response system 30 may be shown on a display located within an operator station on vehicle 10. The notification may provide a visual and/or audible alert regarding current or predicted surface conditions. In this manner, the operator may be able to take necessary steps to avoid the soft underfoot conditions entirely, or to minimize any negative effects associated with the vehicle traveling through the soft underfoot conditions location.

It will be apparent to those skilled in the art that various modifications and variations can be made to the soft underfoot conditions response system of the present disclosure without departing from the scope of the disclosure. Other embodiments will be apparent to those skilled in the art from consideration of the specification and practice of the system and methods disclosed herein. It is intended that the specification and examples be considered as exemplary only, with a true scope of the disclosure being indicated by the following claims and their equivalent.

What is claimed is:

1. A soft underfoot conditions response system for use with a vehicle, the system comprising:
    a sensing system configured to generate signals indicative of live data representing at least one of real time wheel slip ratio and real time rolling resistance for the vehicle operating at a job site;
    a plurality of sensors configured to transmit signals indicative of live data representing at least one of an image of a job site surface having features and characteristics associated with a presence or a lack of soft underfoot conditions, real time vehicle speed, vehicle acceleration, vehicle pose, vehicle payload, engine torque, engine power output, and engine RPM; and
    a controller comprising one or more processors, and one or more memory devices, the controller being communicatively coupled with the sensing system and the sensors, and configured and programmed to:
        receive the live data from the sensing system and the sensors;
        receive reference data representative of soft underfoot conditions from a database;
        analyze the live data received from the sensing system and the sensors, and the reference data received from the database;
        determine a first set of parameters including measured real time values corresponding to at least one of an image of job site surface conditions, wheel slip ratio, rolling resistance, vehicle speed, and vehicle pose;
        extract from the reference data at least one of a first data subset containing at least one of an image of job site surface conditions and vehicle operational parameters identified by an operator as being associated with soft underfoot conditions, and a second data subset containing data extracted using heuristics including identification of values for a mean rolling resistance greater than a threshold level of rolling resistance for greater than a first threshold time period, values for a vehicle speed greater than a threshold level of vehicle speed, and values for a wheel slip ratio greater than a threshold level of wheel slip ratio for greater than a second threshold time period;
        build and train a model for use by a classifier that segregates data subsets from the first set of parameters into a first classification that includes parameters that characterize surfaces with soft underfoot conditions, and a second classification that includes parameters that characterize surfaces without soft underfoot conditions; and
        generate control command signals that cause a change in vehicle operational parameters to reduce or avoid any effects on operation of the vehicle associated with soft underfoot conditions.

2. The soft underfoot condition response system of claim 1, wherein the controller is configured to calculate the second data subset of the reference data using a sliding window approach, wherein a size of the sliding window depends on the data.

3. The soft underfoot condition response system of claim 2, wherein the controller is configured to estimate features that include at least one of a mean of values of rolling resistance, a mean of values of wheel slip ratio, a mean of values of vehicle velocity, a variance in values of vehicle roll, a variance in values of vehicle pitch, and a variance in values of vehicle yaw for every second of data extracted from the reference data.

4. The soft underfoot condition response system of claim 3, wherein the controller is further configured to normalize each feature dimension in the second data subset by subtracting each value for each feature dimension from a mean of all of the values for the feature dimension and dividing the result by twice a standard deviation for all of the values for the feature dimension.

5. The soft underfoot condition response system of claim 1, wherein the controller is configured to build and train a model for use by a machine learning classifier using a K-Nearest Neighbor (KNN) search algorithm.

6. The soft underfoot condition response system of claim 5, wherein the controller is configured to run the KNN search algorithm using a 10-fold cross-validation for determining a number of neighbors that results in an increase in accuracy of the model when using a Euclidean distance similarity metric.

7. The soft underfoot condition response system of claim 1, wherein the controller is configured to build and train a model for use by a machine learning classifier using a Support Vector Machine (SVM).

8. The soft underfoot condition response system of claim 7, wherein the SVM model is configured to classify measured real time values from the first set of parameters as characterizing machine operational parameters indicative of one of the presence of soft underfoot conditions or the lack of soft underfoot conditions.

9. The soft underfoot condition response system of claim 1, wherein the controller is configured to determine the rolling resistance for the vehicle using values for engine torque, engine power output, and engine RPM derived from the plurality of sensors.

10. A method for predicting and responding to soft underfoot conditions, comprising:
    transmitting signals from sensors associated with the vehicle and indicative of live data representing at least one of an image of a job site surface having features and characteristics associated with a presence or a lack of soft underfoot conditions, real time vehicle speed, vehicle acceleration, vehicle pose, vehicle payload, engine torque, engine power output, and engine RPM;

generating signals indicative of live data representing at least one of real time wheel slip ratio, real time rolling resistance for the vehicle operating at a job site; and receiving the live data at a controller;

receiving, at the controller, reference data representative of soft underfoot conditions from a database;

analyzing, using a processor of the controller, the live data and the reference data;

determining a first set of parameters including measured real time values corresponding to at least one of an image of job site surface conditions, wheel slip ratio, rolling resistance, vehicle speed, and vehicle pose;

extracting from the reference data at least one of a first data subset containing at least one of an image of job site surface conditions and vehicle operational parameters identified by an operator as being associated with soft underfoot conditions, and a second data subset containing data extracted using heuristics including identifying values for a mean rolling resistance greater than a threshold level of rolling resistance for greater than a first threshold time period, values for a vehicle speed greater than a threshold level of vehicle speed, and values for a wheel slip ratio greater than a threshold level of wheel slip ratio for greater than a second threshold time period;

building and training a model for use by a classifier that segregates data subsets from the first set of parameters into a first classification that includes parameters that characterize surfaces with soft underfoot conditions, and a second classification that includes parameters that characterize surfaces without soft underfoot conditions; and generating control command signals that cause a change in vehicle operational parameters to reduce or avoid any effects on operation of the vehicle associated with soft underfoot conditions.

11. The method of claim 10, further including calculating the second data subset of the reference data using a sliding window approach, wherein a size of the sliding window is set to one second.

12. The method of claim 11, further including estimating features that include at least one of a mean of values of rolling resistance, a mean of values of wheel slip ratio, a mean of values of vehicle velocity, a variance in values of vehicle roll, a variance in values of vehicle pitch, and a variance in values of vehicle yaw for every second of data extracted from the reference data.

13. The method of claim 12, further including normalizing each feature dimension in the second data subset by subtracting each value for each feature dimension from a mean of all of the values for the feature dimension and dividing the result by twice a standard deviation for all of the values for the feature dimension.

14. The method of claim 10, further including building and training a model for use by a machine learning classifier using a K-Nearest Neighbor (KNN) search algorithm.

15. The method of claim 14, further including running the KNN search algorithm using a 10-fold cross-validation for determining a number of neighbors that results in an increase in accuracy of the model when using a Euclidean distance similarity metric.

16. The method of claim 10, further including building and training a model for use by a machine learning classifier using a Support Vector Machine (SVM).

17. The method of claim 16, wherein the SVM model classifies measured real time values from the first set of parameters as characterizing machine operational parameters indicative of one of the presence of soft underfoot conditions or the lack of soft underfoot conditions.

18. A computer-readable medium for use in a soft underfoot conditions response system to predict and respond to soft underfoot conditions, the computer-readable medium including computer-executable instructions for performing a method for predicting and responding to soft underfoot conditions, wherein the method comprises:

transmitting signals from sensors mounted on the vehicle indicative of live data representing at least one of real time vehicle speed, vehicle acceleration, vehicle pose, vehicle payload, engine torque, engine power output, and engine RPM;

generating signals indicative of live data representing at least one of real time wheel slip ratio and real time rolling resistance for the vehicle operating at a job site; and receiving the live data at a controller;

receiving, at the controller, reference data representative of soft underfoot conditions from a database;

analyzing, using a processor of the controller, the live data and the reference data;

determining a first set of parameters including measured real time values corresponding to wheel slip ratio and rolling resistance, vehicle speed, and vehicle pose;

extracting from the reference data at least one of a first data subset containing vehicle operational parameters identified by an operator as being associated with soft underfoot conditions, and a second data subset containing data extracted using heuristics including identifying values for a mean rolling resistance greater than a threshold level of rolling resistance for greater than a first threshold time period, values for a vehicle speed greater than a threshold level of vehicle speed, and values for a wheel slip ratio greater than a threshold level of wheel slip ratio for greater than a second threshold time period;

building and training a model for use by a classifier that segregates data subsets from the first set of parameters into a first classification that includes parameters that characterize surfaces with soft underfoot conditions, and a second classification that includes parameters that characterize surfaces without soft underfoot conditions; and generating control command signals that cause a change in vehicle operational parameters to reduce or avoid any effects on operation of the vehicle associated with soft underfoot conditions.

19. The computer-readable medium of claim 18, wherein the method further includes:

calculating the second data subset of the reference data using a sliding window approach, wherein a size of the sliding window is set to one second;

estimating features that include at least one of a mean of values of rolling resistance, a mean of values of wheel slip ratio, a mean of values of vehicle velocity, a variance in values of vehicle roll, a variance in values of vehicle pitch, and a variance in values of vehicle yaw for every second of data extracted from the reference data; and normalizing each feature dimension in the second data subset by subtracting each value for each feature dimension from a mean of all of the values for the feature dimension and dividing the result by twice a standard deviation for all of the values for the feature dimension.

20. The computer-readable medium of claim 18, wherein the method further includes building and training a model for use by a machine learning classifier using at least one of a K-Nearest Neighbor (KNN) search algorithm and a Support Vector Machine (SVM), wherein the model classifies measured real time values from the first set of parameters as characterizing machine operational parameters indicative of one of the presence of soft underfoot conditions or the lack of soft underfoot conditions.

* * * * *